May 17, 1966  K. S. JENSON ETAL  3,251,290
VENTILATING HOOD
Filed Dec. 24, 1963

INVENTORS:
Kenneth S. Jenson
John E. Gilbertson
Archie E. Chamberlain
By Hofgren, Wegner, Allen, Stellman & McCord
Attys

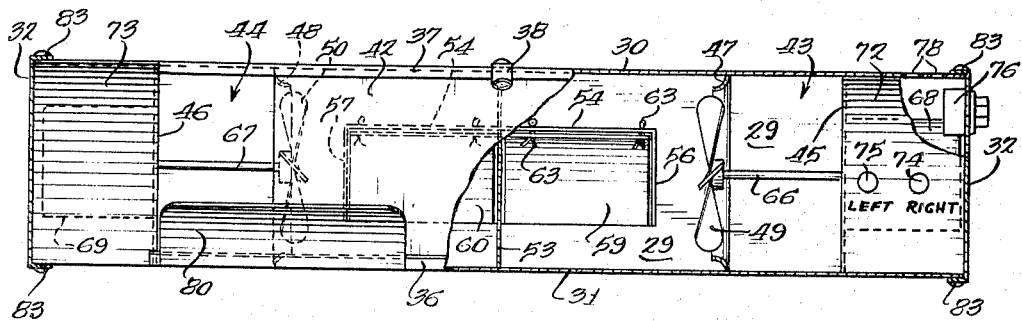
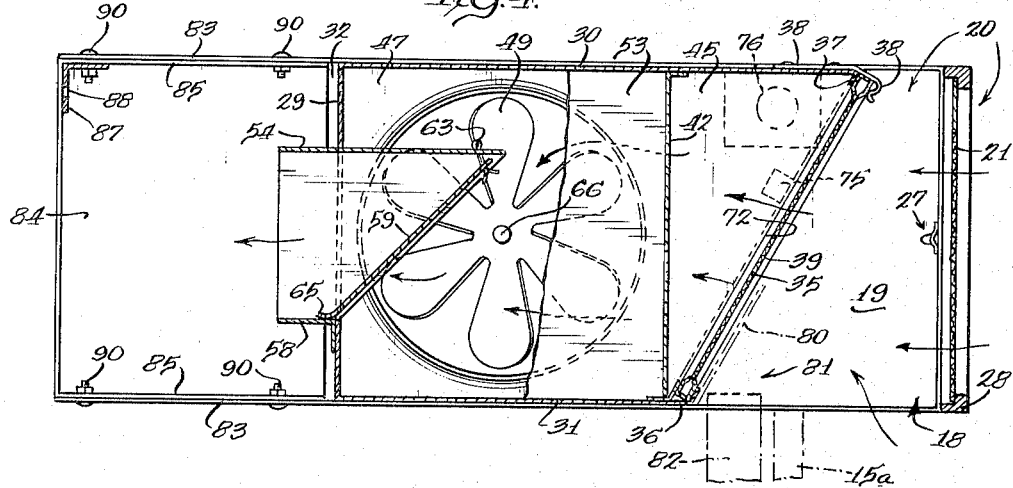
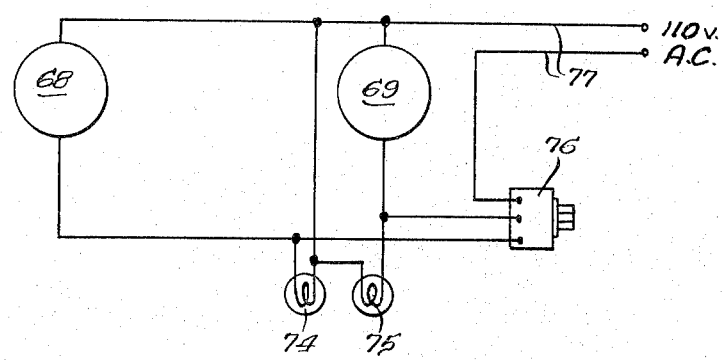

United States Patent Office 3,251,290
Patented May 17, 1966

3,251,290
VENTILATING HOOD
Kenneth S. Jenson, John E. Gilbertson, and Archie E. Chamberlain, Wisconsin Rapids, Wis., assignors to Preway, Inc., a corporation of Wisconsin
Filed Dec. 24, 1963, Ser. No. 333,116
5 Claims. (Cl. 98—115)

This invention relates to ventilating hoods and especially to such hoods which are useful for exhausting cooking gases from a cooking area.

Ventilating hoods, for example those used in kitchen exhaust systems, are more and more becoming standard kitchen equipment. Such hoods are mounted above cooking areas and connected with duct work from overhead or from a wall behind the hood for conducting gases away from the hood and venting them to the exterior through a wall or the like. Such hoods are usually installed and positioned to collect and exhaust cooking gases rising from a cooking surface and serve to exhaust moisture, greases and cooking odors from the cooking area.

A cooking surface will often have an oven associated therewith, e.g. therebelow or adjacent to or above and rearward of the cooking surface. The cooking gases from the oven, or hot oven gases, are often merely exhausted from the oven into the kitchen and sometimes are picked up only by happenstance by the vent hood. Where the oven gases are directed into the cooking area beneath the vent hood, it is necessary to keep the blower of the vent hood running while the oven is on if it is desired to exhaust the oven gases from the room. The vent hood blowers may have a capacity for handling both oven and cooking surface gases, but use of the full exhaust blower power for merely exhausting the small volumes of very hot oven gases is considered wasteful.

It has been proposed to install a two-speed motor in a ventilating hood, the lower speed being usable for exhausting merely the oven gases, while the higher speed is useful for exhausting either the cooking surfaces gases alone or both the oven and cooking surface gases together. However, the high speed or additional power needed for exhausting the gases from a large cooking surface and a large oven requires the use of a large motor and impeller. The design of the ventilating hood may not permit the installation of such a large exhaust blower and motor while still permitting efficient use of the blower power.

At times, the oven is constructed to vent the oven gases directly into the ventilating hood at an oven gas vent position, but the hood is not adapted to particularly handle the very hot smaller volume gases at such oven gas inlet position. For example, in those installations where the oven is installed above and to the rear of the cooking surface, the ventilating hood may be mounted directly on top of the oven with a forward overhang sufficient to draw cooking gases from the oven doors and from the cooking surface. The hot, smaller volume gases from the interior of the oven may be vented directly upward into the hood at the gas vent position for following the same path as any other gases introduced into the hood.

It is a general object of this invention to provide a new and useful ventilating hood of the character herein described.

It is also the object of this invention to provide a new and useful ventilating hood which is capable of receiving cooking gases from both an oven and a cooking surface.

A further object is to provide such a ventilating hood wherein a separate exhaust flow path is provided in a hood unit for receiving and exhausting the oven vent gases.

It is also the object of this invention to provide such a system wherein a pair of separate flow paths is defined and wherein each flow path may include separate selectively operable impeller means for selective use of one or both flow paths.

Yet another object of this invention is to provide a ventilating hood in accordance with any of the foregoing objects wherein the hood is adapted to positively mix hotter gases vented from an oven with cool air prior to exhausting the gases through one of the flow paths; in one aspect it is an object to provide such a hood with an intake chamber through which all gases pass and in which all gases are combined with cooling air, the oven vent gases being positively mixed with the cooling air.

Still another object of this invention is to permit exhausting of oven gases without the necessity of using a greater exhausting force than that which would normally be advantageous or required for removing the greater volume of cooking surface gases, in addition to oven gases, while still permitting use of the greater exhausting force when desired.

And another object of this invention is to provide a new and useful ventilating hood which is adapted to overhang an oven for receiving cooking gases from a cooking surface and in which the overhang is adjustable.

Other objects of this invention will be apparent from the following description and the drawings in which:

FIGURE 3 is a front view and partial section of the hood of FIGURE 1 with the front grill work removed for better illustration of internal parts;

FIGURE 4 is a section through the hood of FIGURE 1 along the line 4—4 of FIGURE 2; and FIGURE 5 is a schematic wiring diagram of the electrical control system for use in the ventilating hood of FIGURE 1.

Figure 1:
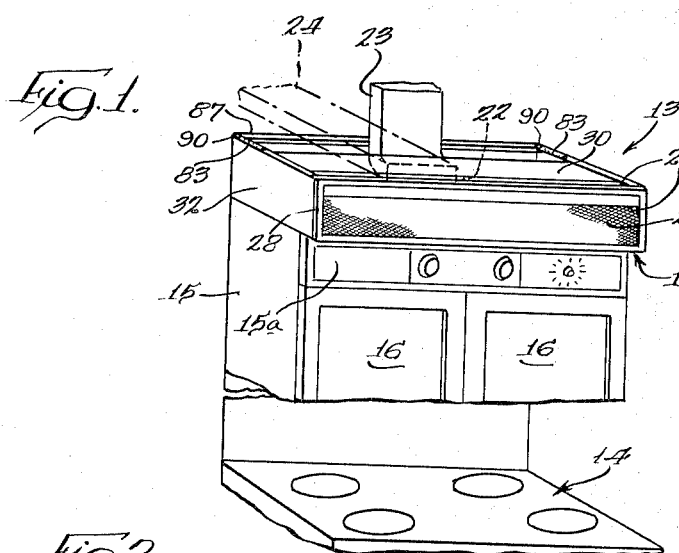
FIGURE 1 is a perspective view of a form of ventilating hood of this invention installed by mounting above an oven.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

Figure 2:
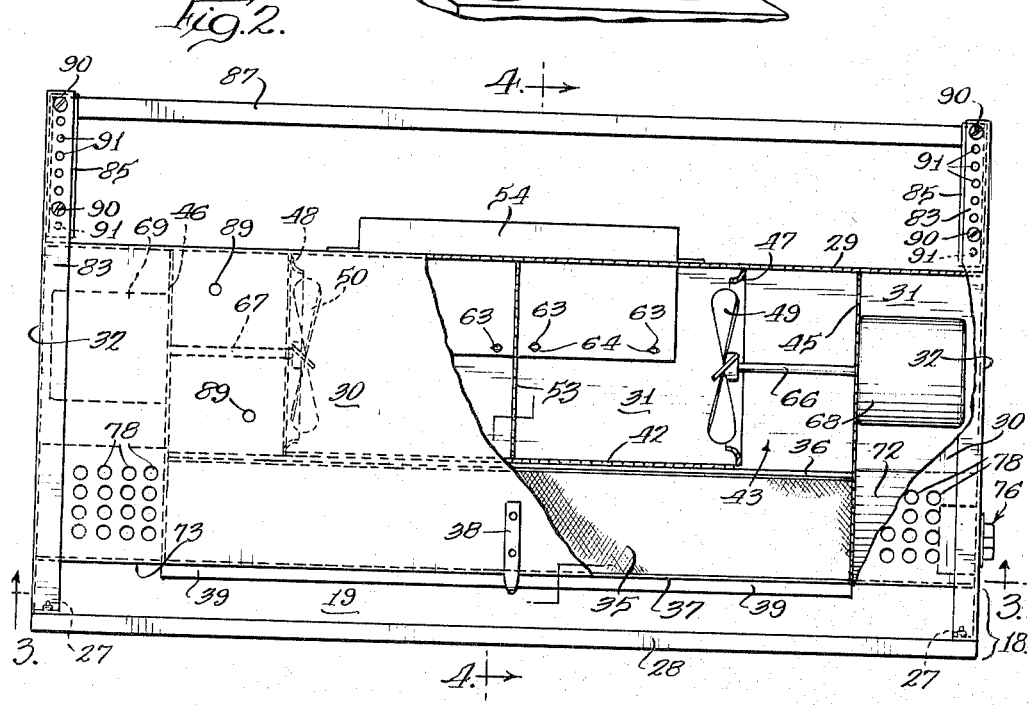
FIGURE 2 is a top view and partial section of the hood of FIGURE 1.

As an illustrative form of the present invention, turning first to FIGURE 1, of the drawings, there is illustrated a ventilating hood 13 mounted over a cooking surface 14 and above an oven 15. The oven doors 16 are on the front of the oven and the cooking surface 14, in its operative position as shown, extends forward beyond the oven doors 16. The hood 13 overhangs the front 15a of oven 15 to provide an overhanging hot air inlet 18 for inlet to an intake chamber 19 (FIGURES 2 and 4). Inlet chamber 19 also has a cool air inlet 20 which includes a front grill 21. Hood 13 has an exhaust outlet at 22 which is shown joined to suitable duct work 23 which may, in turn, be joined to overhead duct work for conducting the vented gases. A second duct 24 is shown in phantom illustrating the use of duct work for joining to other duct work in a wall against which the hood may be mounted.

In general operation, cooking gases from oven 15 and/or cooking surface 14 are drawn into intake chamber 19, passed through the hood and exhausted through outlet 22. The overhanging inlet 18 is the inlet for gases rising from cook surface 14 and from oven 15 when doors 16 are opened. Some of these gases may also pass into chamber 19 through grill 21 although grill 21 usually admits relatively cooler air.

Considering now FIGURES 1–4 generally, the ventilating hood includes a casing which is formed by a front casing wall indicated generally at 28. Casing wall 28 is in the form of a frame for grill 21. The casing also includes a rear casing wall 29, a top casing wall 30, a bottom casing wall 31, and a pair of opposing side casing walls 32. Frame 28 is releasably joined to inturned flanges at the front edge of each side wall 32 by means of a snap catch mechanism 27. Grill 21, secured in frame 28, is, therefore, removable with frame 28 from the front of the ventilating hood for purpose of access to the interior, e.g., for cleaning, removing and/or replacing filter elements, repair or the like.

The ventilating hood includes a framed filter element 35 which is removably mounted within intake chamber 19 and is disposed at an incline across chamber 19 in the path of all gases entering the hood through inlet 18 or 20 and passing through chamber 19 to the interior of the hood. The lower edge of filter 35 is loosely held within a channel 36 formed of a pair of angular flanges extending at an incline upward from wall 31. The upper edge of filter 35 abuts an angle flange 37 and is held thereagainst by a releasable spring clip 38 secured to top wall 30. The frame for the filter element is indicated generally by reference numeral 39. It is apparent that by pulling spring clip 38 upward, clip 38 functioning as a leaf spring, filter 35 will fall away from abutment with flange 37 and the filter may then be lifted from channel 36 for removal of the same. Replacement of the filter after cleaning or the like is apparent.

Behind or beyond filter 35 and defining the rearward limit of intake chamber 19 is an upstanding wall 42 secured to the interior of walls 30 and 31 and extending across the central portion of the vent hood. Laterally of each end of wall 42, flow path inlets 43 and 44 are provided. It will be noted that inlets 43 and 44 are separate and spaced from each other the distance of the width of wall 42.

Laterally of inlets 43 and 44, respectively, are a pair of upstanding walls 45 and 46 extending from adjacent the end edges of filter 35 rearward to casing wall 29. Walls 45 and 46 are secured to top wall 30, bottom wall 31, and rear wall 29. Walls 45 and 46 define side walls of the two separate flow paths having their inlets at 43 and 44. Extending rearward from the lateral edges of wall 42 are ported walls or restrictions 47 and 48 extending across the respective flow paths. Walls 47 and 48 are, in effect, rearward extensions of the ends of wall 42 and are secured to top wall 30, bottom wall 31, and rear wall 29. The ports in walls 47 and 48 are defined by circular curved flanges pointing downstream with respect to each respective flow path. Each circular curved flange defines a throat in which is positioned an impeller in the form of a fan blade 49 or 50.

Extending centrally from wall 42 rearward to wall 29 and secured to walls 42, 29, 30 and 31 is an upstanding central wall member 53 which serves as a partition wall between the two flow paths. A rectangular opening is provided in back wall 29 between the impeller throat walls 47 and 48, and the rectangular opening is generally bisected by upstanding wall 53.

On either side of wall 53 an exhaust passage is provided extending from each flow path outward through wall 29. Accordingly, a large sheet metal rectangular or box-shaped duct is defined by a top wall 54, a bottom wall 58, and side walls 56 and 57. The walls are interconnected at their edges and the bottom wall 58 and side walls 56 and 57 have laterally projecting flanges secured facially against the exterior of rear wall 29 by welding. Top wall 54 extends into both flow paths and is received by a slot (not shown) in wall 53. Wall 53 extends rearward to an edge abutting or in alignment with rear wall 29 and, in effect, bisects the rectangular outlet duct providing separate communication of either flow path through the duct. The outlet duct formed by walls 54, 56, 57 and 58 is adapted for junction to suitable duct work such as shown at 23 or 24 in FIGURE 1 and defines the outlet 22 referred to hereinabove.

Separate damper plates 59 and 60 are provided for each flow path, each being mounted by cotter pins 63 loosely and hingedly to top wall 54. The cotter pins 63 extend through punched holes or bores 64 in plate 54 and in damper plates 59 and 60, and are spread beyond damper plates 59 and 60, plates 59 and 60 being slidable on pins 63 relative to plate 54. The loose interconnection by the cotter pin 63 permits the damper plates 59 and 60 to swing clockwise, as viewed in FIGURE 4, as a result of a draft from within the vent hood toward outlet 22. Of course, only the damper plate at the outlet of the flow path through which the draft is being forced will open. The other damper prevents backflow or recycle of exhaust gases through the other flow path. The damper plates are provided with flanged lower edges 65 which abut plate 58 when no draft is present or when a back draft urges against the damper plate.

In general, each flow path extends from its inlet 43 or 44 to its damper plate 59 or 60. The impellers or fan blades 49 or 50 in throats 47 or 48 draw the gases from intake chamber 19 through the flow path inlets and exhaust the gases beyond the damper plates.

As will be seen from the wiring diagram of FIGURE 5, with explanation thereof, the device is capable of control for drawing air through one, both, or neither of the flow paths. In a particular form illustrated, it is possible to use the left-hand flow path having inlet 44 alone, to use both separate flow paths at the same time, or to use neither.

An electric power source line 77 is supplied to the motors and lamps in the diagram of FIGURE 5 through switch 76. Switch 76 includes three contacts *a*, *b*, and *c*. The switch is a three-position switch having positions in which (1) none of the contacts is closed with another, (2) contact *a* is closed with contact *b*, and (3) contact *a* is closed with both contacts *b* and *c*. In the first position, the device is in "off" position with neither of the blower motors 68 or 69 operating. In the second position, blower motor 69 is operating and indicator lamp 75 is lit. In the third position of switch 76, both motors 68 and 69 and both indicator lamps 74 and 75 are energized.

The draft through the separate flow paths is provided by rotation of the fan blades 49 or 50 which are mounted, respectively, on shafts 66 and 67 of motors 68 and 69. Motors 68 and 69 are secured to and beyond walls 45 and 46, respectively, by suitable mounting means, with shafts 66 and 67 rotatably extending through the walls. Walls 45 and 46 shield the motors from the heat of gases passing through the respective flow paths. Walls 45 and 46, at the front ends thereof, terminate at inclined edges generally along the incline of filter 35. From the inclined edges, the sheet metal of walls 45 and 46 extends laterally as inclined walls 72 and 73, which are secured to the inner surface of side walls 32. Mounted on inclined wall 72 are the pair of lamps 74 and 75 which function as indictor lamps for indicating which of fans 49 or 50 is in operation, if either.

Walls 45 and 72 and walls 46 and 73, together with the exterior casing walls, define chambers for motors 68 and 69 away from the hot gas flow paths. The motor chambers may also serve as a convenient protected mounting place for various electrical components. Thus, in the right-hand motor chamber, as viewed in FIGURES 2 and 3, the indicator lamps 74 and 75 are mounted through wall 72. Also, mounted in the right-hand side wall 32 there is a switch 76 for operating the blower motors. The wiring for switch 76, lamps 74 and 75, and motor 68 is within the chamber for motor 68.

The compartments enclosing motors 68 and 69 are vented by holes 78 in top wall 30 permitting flow of heat from the chambers. Even where the hood is mounted to a top surface, the vent holes 78 provide sufficient ventilation or circulation.

It will be noted, especially with reference to FIGURE 3, that there is provided a baffle plate 80 adjacent inlet 43 to the left-hand flow path. Baffle 80 is secured at its lower edge to bottom wall 31 and extends upward on an incline in front of filter 35, as may be seen in FIGURE 3 and in phantom in FIGURE 4. Baffle 80 is a form of means for mixing hot gases entering chamber 19 at position 81 through inlet 18 under the suction of the impeller 50. Position 81 is a hot oven gas inlet position of inlet 18 and the hot oven gases entering at 81 from oven exhaust stack or vent 82 (FIGURE 4) are deflected by baffle 80 for more intimate mixture with cool air entering inlet 20 prior to drawing of the gases through flow path inlet 44. Because the gases are more intimately mixed with the cool air and with a larger volume of cool air, additional cooling of the gases is effected.

The baffle 80 and hot oven gas inlet position 81 adapt the ventilating hood particularly to mounting directly over an oven. The stack or vent 82 from the oven is positioned at the inlet position 81 and directed generally against baffle plate 80 so that baffle plate 80 may serve to divert the rising gases for the additional cooling effect.

It is intended in the illustrated form that the left-hand flow path be used for drawing oven vent gases through the ventilating hood and exhausting the same. This flow path can be used alone with switch 76 operated to close contacts *a* and *b* only, e.g., when only the oven is going, or in combination with the right-hand flow path with switch 76 operated to close contact *a* with both *b* and *c*, e.g., whenever full draft power is needed or desired.

The present device may be mounted for connection to either ceiling or a wall duct work and may be secured to an overhead structure or wall structure, if desired, or may alternatively be secured to the top of an oven structure such as that shown at 15 in FIGURE 1. In each mounted position, the inlet 18 overhangs the front edge of any structure therebelow, and because of the possible variance in depths of structures, the ventilating hood is also provided with a variable depth adjustment so that a proper overhang may be assured while providing suitable securement of the rear of the hood to a wall structure, if desired, and while providing a suitably pleasing appearing continuous outer side wall structure.

Each of side walls 32 is provided with a pair of inturned flanges 83 along the upper and lower edges thereof. Flanges 83 are secured to top wall 30 and bottom wall 31 in the casing assembly. However, side walls 32 extend rearwardly beyond wall 29 and the inturned flanges 83 also extend rearwardly beyond walls 30 and 31. A pair of panels 84 are provided as extensible portions of side walls 32. Flanges 85 turned inward from upper and lower edges of panels 84 give panels 84 a shallow, channel-like configuration. Side walls 32 are also, in effect, channels with inwardly turned legs. Panels 84 are configurated or sized to be telescopically received within the channel configurations of side walls 32, slidable face-to-face against the interior faces of the rearward extensions of walls 32.

The pair of panels 84 also include inwardly extending end flanges 86, the flange 86 of each of panels 84 being secured to an opposite end of an angle brace member 87. Angle brace member 87 is of a length correctly spacing panels 84 for parallel sliding within channels 32. Angle brace 87 is provided with a plurality of mounting holes 88 for securing the hood device against a wall structure when desired. Mounting holes 89 are also provided in the top wall 30 of the hood casing and screwdriver access holes may be provided in the bottom casing wall 31 as desired for driving screws through holes 89 for mounting the hood from overhead structures.

A plurality of bolts and nuts 90 are provided for releasably holding each panel 84 at a preselected telescopic disposition relative to its associated wall 32. Inwardly turned flanges 83 and 85 have equally spaced bores 91 for receiving bolts 90. In the telescopic arrangement, one flange 85 slides against each flange 83. Bores 91 are the same distance on center from each other in their linear array in each of flanges 83 and 85 and therefore become aligned at various spaced positions of relative telescopic sliding of the flanges. In installing the hood, the hood casing is positioned with the approximate proper front overhang and bolts and nuts 90 are removed. Angle brace 87 and panels 84 are slid rearward toward the back wall structure. The telescopic sliding is then adjusted until the bores 91 in flanges 83 and 85 in nearest alignment are aligned. The bolt and nut assemblies are replaced through bores 91 to secure the selected telescopic disposition, and angle brace 87 may be screwed to the rear wall structure via holes 88, if desired. The outer surface of side walls 32 and of the extension panels 84 provide a continuous wall which may be painted, e.g., pre-painted.

We claim:

1. A ventilating hood comprising a casing having an inlet chamber and an outlet, separate cool and hot air intakes defining flow communication between said inlet chamber and the exterior of said casing, said hot air intake having a hot oven gas intake position, means defining two separate flow paths from said inlet chamber to said outlet, one of said flow paths originating at said inlet chamber adjacent said hot oven gas intake position, exhaust blower means in each flow path, baffle means in said inlet chamber between said hot oven gas intake position and said one flow path disposed to deflect hot gases entering said hot air intake at said hot oven gas intake position for admixture with cool air entering said cool air intake prior to entry of the hot gases into said one flow path, and selection means for actuating one, both or neither of said exhaust blower means for selecting one, both or neither of said flow paths.

2. A ventilating hood comprising a hexahedral casing including a top wall, a bottom wall, a front wall, a back wall, and two side walls, rearward inwardly turned channel extensions of each side wall beyond said back wall, a rear frame assembly including a pair of side panels and means for securing said side panels in spaced parallel disposition relative to each other, said rear frame assembly being of a size telescopically slidable between said channel extensions with said side panels sliding in said channel extensions, and means for releasably securing said frame assembly at a selected one of a plurality of telescopic dispositions relative to said casing.

3. A ventilating hood comprising a casing having an inlet and an outlet; means defining two separate flow paths through said casing from said inlet to said outlet; separate impeller means in each of said flow paths for impelling exhaust gases as separate and independent streams through said flow paths; a partition means dividing said outlet into separate outlets for each flow path; and a separate damper across each of said separate outlets and including a plate, hinge means adjacent an upper edge of said plate suspending said plate on a downward incline toward the outward direction of said outlet, said plate being slightly smaller than the width of said outlet for free movement on said hinge and having the edge opposing said hinge abutting the bottom wall of said outlet under weight of gravity of said plate when said plate is in a normal position, said plate in said normal position checking the back flow of gases through said outlet but being movable on said hinge toward a horizontal position under exhausting force from the interior of said casing outward through said outlet to block said outlet and permit free flow of gases outward therethrough.

4. A ventilating hood comprising a casing for the passage of air therethrough from an inlet thereof to an outlet thereof, said casing including a top wall, a bottom wall, a back wall, a front wall and two side walls, each of said side walls being adapted for adjustment beyond said casing back wall and including an extension slidable relative to said side walls and a rear frame disposed behind said casing back wall and secured to the rear extremities of said side wall extensions; and means for releasably securing said extensions at a selective one of a plurality of positions relative to said casing side walls.

5. A ventilating hood comprising a casing having an inlet chamber and an outlet, means defining two separate flow paths from said inlet chamber to said outlet, a separate motor-driven exhaust blower in each flow path, means defining a separate chamber for the motor of each of said separate motor-driven exhaust blowers separate from said flow paths, means mounting each motor in its respective chamber, and vent means through said casing from each motor chamber for permitting the ventilation of each motor chamber by circulation of cool air therethrough.

References Cited by the Examiner
UNITED STATES PATENTS

| | | | |
|---|---|---|---|
| 2,584,613 | 2/1952 | Pledger | 98—115 |
| 3,051,158 | 7/1962 | Kimberley | 98—115 |
| 3,089,479 | 5/1963 | Perl | 98—115 |
| 3,109,358 | 11/1963 | Meyer | 98—115 |
| 3,131,687 | 5/1964 | Kalla | 126—299 |
| 3,176,605 | 4/1965 | Jenson | 126—299 |

WILLIAM F. O'DEA, *Primary Examiner.*

JOHN F. O'CONNOR, *Examiner.*